United States Patent
Chao et al.

(10) Patent No.: US 8,212,935 B2
(45) Date of Patent: Jul. 3, 2012

(54) NOISE REDUCTION APPARATUS FOR IMAGE SIGNAL AND METHOD THEREOF

(75) Inventors: Po-Wei Chao, Taipei Hsien (TW); Hsin-Ying Ou, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1414 days.

(21) Appl. No.: 11/755,002

(22) Filed: May 30, 2007

(65) Prior Publication Data
US 2007/0291178 A1   Dec. 20, 2007

(30) Foreign Application Priority Data
Jun. 14, 2006 (TW) .............................. 95121242 A

(51) Int. Cl.
*H04N 5/00* (2011.01)
(52) U.S. Cl. ...................... 348/620; 348/607
(58) Field of Classification Search ........... 348/607–624
See application file for complete search history.

(56) References Cited

U.S. PATENT DOCUMENTS

| | | | |
|---|---|---|---|
| 4,694,342 A | 9/1987 | Klees | |
| 5,903,680 A | 5/1999 | De Haan | |
| 6,061,100 A | 5/2000 | Ward | |
| 6,137,917 A | 10/2000 | Park | |
| 6,385,261 B1 | 5/2002 | Tsuji | |
| 6,430,318 B1 | 8/2002 | Florent | |
| 6,591,398 B1 | 7/2003 | Kondo | |
| 7,130,481 B2 | 10/2006 | Yu | |
| 7,145,607 B1 | 12/2006 | Hui | |
| 7,280,161 B2 * | 10/2007 | Satou et al. | 348/701 |
| 7,330,218 B2 * | 2/2008 | Lin et al. | 348/619 |
| 2003/0156301 A1 | 8/2003 | Kempf | |

* cited by examiner

*Primary Examiner* — Michael Lee
(74) *Attorney, Agent, or Firm* — Thomas, Kayden, Horstemeyer & Risley, LLP

(57) ABSTRACT

The present invention provides a noise reduction apparatus and method thereof. The noise reduction apparatus includes a first detecting logic, a second detecting logic, a first noise filtering logic, a second noise filtering logic, and an output logic. The first detecting logic detects if a video signal has a first noise characteristic. The second detecting logic detects if the video signal has a second noise characteristic. The first noise filtering logic performs a first noise filtering process upon the video signal to generate a first filtered signal. The second noise filtering logic performs a second noise filtering process upon the video signal to generate a second filtered signal. The output logic receives the first filtered signal and the second filtered signal, and references detection results provided by the first detecting logic and the second detecting logic when generating an output signal.

14 Claims, 5 Drawing Sheets

NOISE REDUCTION APPARATUS FOR IMAGE SIGNAL AND METHOD THEREOF

BACKGROUND OF THE INVENTION

1. Field of the Invention

The present invention relates to an image processing technology, and more particularly, to a noise reduction apparatus for image signal and method thereof.

2. Description of the Prior Art

In the field of image processing, such as television video signal processing, interference on image quality from various types of noise is a frequently confronted problem; for example, such noise types as impulse noise, spatial noise, temporal noise, and other well-known sources of noise. In general during noise processing, one dedicated circuit is adopted for detecting and suppressing noise interference contributed by each type of noise. Please refer to FIG. 1. FIG. 1 is a diagram illustrating a typical noise reduction apparatus. The noise reduction apparatus 100 has a plurality of memory devices 110, 130, 150, an impulse noise filtering circuit 120, a spatial noise filtering circuit 140, and a temporal noise filtering circuit 160. Firstly, the memory device 110 receives and stores video data in an input video signal, and the impulse noise filtering circuit 120 detects the video data stored in the memory device 110 and determines whether to perform impulse noise filtering processes upon the stored video data. If it is determined to perform, an impulse noise filtering process is performed and the processed video data is then stored in the memory device 130; otherwise, the video data is directly stored in the memory device 130 without being processed. Next, the spatial noise filtering circuit 140 detects the video data stored in the memory device 130 and determines whether to perform spatial noise filtering processes upon the stored video data. If it is determined to perform, a spatial noise filtering process is performed and the processed video data is then stored in the memory device 150; otherwise, the video data is directly stored in the memory device 150 without being processed. Lastly, the temporal noise filtering circuit 160 detects the video data stored in the memory device 150 and determines whether to perform a temporal noise filtering process upon the stored video data. If it is determined to perform, a temporal noise filtering process is performed and the processed video data is then outputted to the next stage; otherwise, the video data is directly outputted to the next stage without being processed.

Besides of the implementation as shown in FIG. 1 where every stage has its respective memory devices 110, 130, and 150, there is also another implementation of making use of a shared memory device. That is, every stage reads the video data from a shared memory device and then writes the video data back to the shared memory device after signal detecting, determining, and processing operations are finished, allowing the next stage access to the data stored in the shared memory device.

Noise detection and noise reduction processing techniques of the above-mentioned noise types, such as impulse noise, spatial noise, and temporal noise, are well known in image processing fields, and have already been discussed and disclosed in various publications, for example, in U.S. Pat. Nos. 6,385,261, 6,137,917, 4,694,342, and 6,430,318, etc. The detailed operations and principles are thus omitted herein for brevity.

In the cascade architecture as shown in FIG. 1, because the different noise detecting and processing operations are performed in a sequential and orderly fashion, it is required that the impulse noise filtering circuit 120, spatial noise filtering circuit 140, and temporal noise filtering circuit 160 have their respective and individual computing units. Moreover, because every stage of the noise filtering circuit requires a memory device for temporarily storing, or buffering, the video data of respective stages, the costs of circuit manufacturing increase. Although manufacturing costs can be reduced by adopting a shared memory architecture, the bandwidth of accessing the memory bus becomes heavily burdened due to the fact that the noise filtering circuits need to repetitively access the shared memory.

SUMMARY OF THE INVENTION

It is therefore one of the objectives of the present invention to provide a noise reduction apparatus and method, capable of decreasing the demand on memory device, thereby reducing manufacturing costs.

It is another objective of the present invention to provide a noise reduction apparatus and method, capable of decreasing the demand on bandwidth of accessing memory bus, thereby increasing design flexibility.

It is still another objective of the present invention to provide a noise reduction apparatus and method, capable of smoothing or removing the unwanted artifacts in the image generated due to temporal noise filtering process by performing other type(s) of noise filtering process after the temporal noise filtering process.

According to an exemplary embodiment of the present invention, a noise reduction apparatus is disclosed. The apparatus comprises: a first detecting logic, a second detecting logic, a first noise filtering logic, a second noise filtering logic, and an output logic. The first detecting logic is used to detect if a video signal has a first noise characteristic. The second detecting logic is used to detect if the video signal has a second noise characteristic. The first noise filtering logic is used to perform a first noise filtering process upon the video signal to generate a first filtered signal. The second noise filtering logic is used to perform a second noise filtering process upon the video signal to generate a second filtered signal. The output logic is coupled to the first detecting logic, the second detecting logic, the first noise filtering logic and the second noise filtering logic, for receiving the first filtered signal and the second filtered signal, and referencing detection results provided by the first detecting logic and the second detecting logic when generating an output signal.

According to another exemplary embodiment of the present invention, a noise reduction method is also disclosed. The method comprises: detecting a video signal to determine if the video signal has a first noise characteristic; detecting the video signal to determine if the video signal has a second noise characteristic; performing a first noise filtering process upon the video signal to generate a first filtered signal; performing a second noise filtering process upon the video signal to generate a second filtered signal; and according to detection results of the first noise characteristic and the second noise characteristic, generating and outputting an output signal, wherein a value of the output signal corresponds to at least one of the first filtered signal and the second filtered signal.

According to yet another exemplary embodiment of the present invention, a noise reduction method is also disclosed. The method comprises: (a) storing a first video signal; (b) reading the first video signal stored in step (a); (c) performing a first noise filtering process upon the first video signal read in step (b), wherein the first noise filtering process is performing a temporal noise filtering process upon the first video signal to generate a second video signal; (d) storing the second video signal; (e) reading the second video signal stored in step (d); and (f) performing a second noise filtering process upon the second video signal read in step (e).

These and other objectives of the present invention will no doubt become obvious to those of ordinary skill in the art after reading the following detailed description of the preferred embodiment that is illustrated in the various figures and drawings.

DETAILED DESCRIPTION

Figure 2:
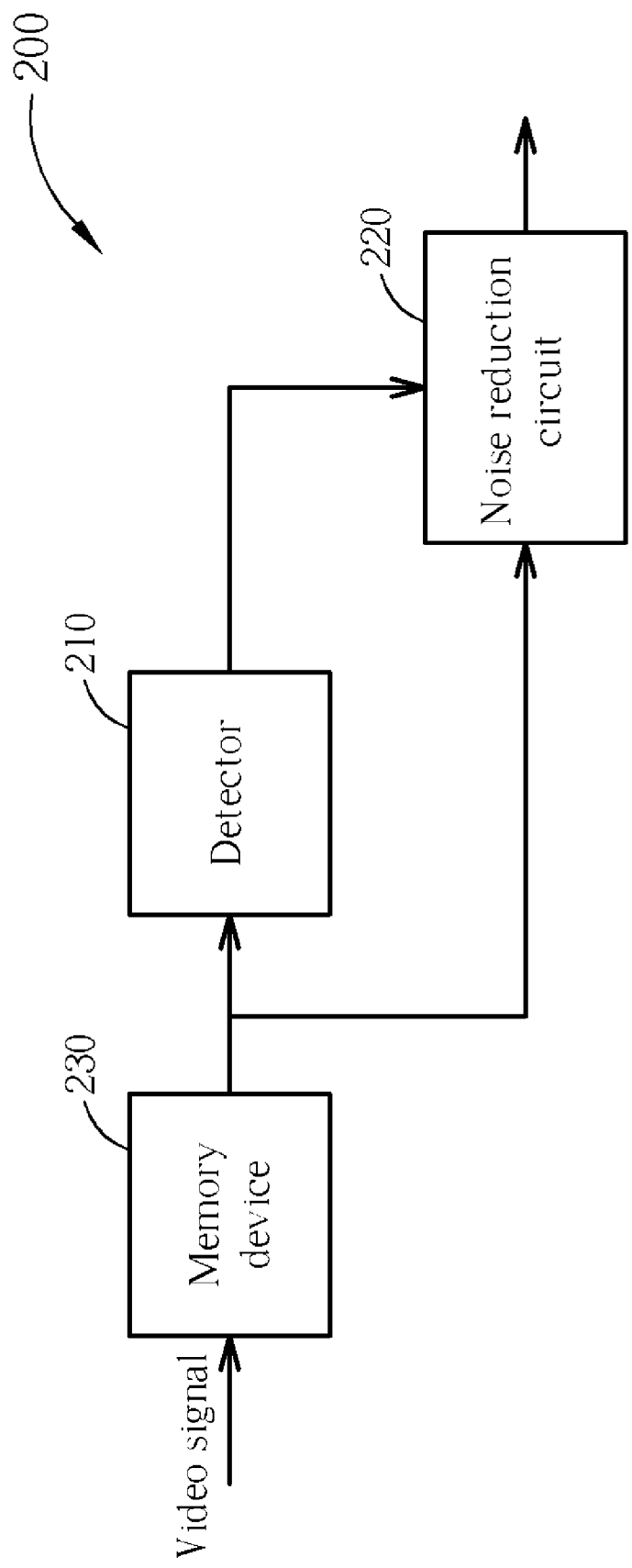
FIG. 2 is a diagram illustrating a noise reduction apparatus for video signals according to a first embodiment of the present invention.

Please refer to FIG. 2. FIG. 2 is a diagram illustrating a noise reduction apparatus 200 for video signals according to a first embodiment of the present invention. The noise reduction apparatus 200 comprises a memory device 230, a detector 210, and a noise reduction circuit 220, and is for performing noise detection and reduction process upon a received video signal on a pixel-by-pixel basis. That is to say, the noise reduction apparatus 200 detects every pixel in the above-mentioned video signal individually to determine the appropriate filtering process, so that the filtering process for different pixels differs according to the detection results. The detector 210 detects a plurality of noise characteristics of the video data stored in the memory device 230 and generates respective corresponding detection results. The noise reduction circuit 220 then determines whether to perform a filtering process upon the video data in response to at least one of the noise characteristics according to the detection results, so as to reduce the noise effect induced by said noise characteristic.

Figure 3:
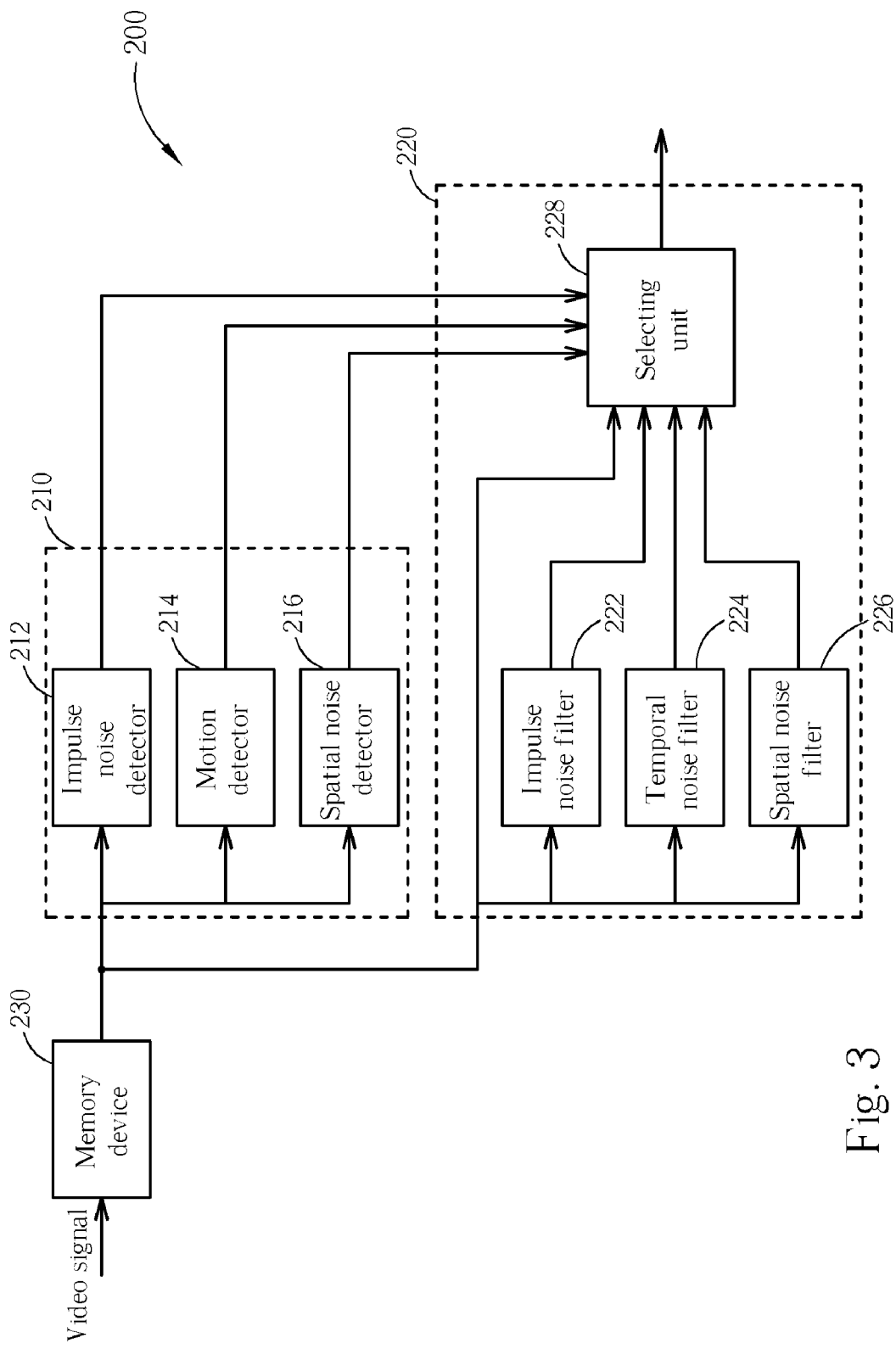
FIG. 3 is a detailed circuit diagram of the noise reduction apparatus shown in FIG. 2.

Please refer to FIG. 3. FIG. 3 is a detailed circuit diagram of the noise reduction apparatus 200 shown in FIG. 2. The detector 210 further comprises an impulse noise detector 212, a motion detector 214, and a spatial noise detector 216. The three detectors all receive and perform detection upon the video signal stored in the memory device 230. The impulse noise detector 212 is for detecting the impulse noise characteristic of the video data; the motion detector 214 is for detecting the degree of motion of the video data, and determining the temporal noise characteristic of the video signal according to the detected degree of motion; and the spatial noise detector 216 is for detecting the spatial noise characteristic of the video data. Please note that the impulse noise detector 212, motion detector 214, and spatial noise detector 216 respectively perform detection upon the video data stored in the memory device 230, and generate respective detection results. In this embodiment, the above-mentioned detection results are one-bit values for respectively representing whether the video signal has impulse noise characteristic, temporal noise characteristic, and spatial noise characteristic. As mentioned previously, the above-mentioned noise characteristic detection techniques are well known to those skilled in the art, and therefore further details are omitted herein for brevity.

The noise reduction circuit 220 comprises an impulse noise filter 222, a temporal noise filter 224, a spatial noise filter 226, and a selecting unit 228. The impulse noise filter 222 performs an impulse noise filtering process upon the video data stored in the memory device 230, and generates an impulse noise filtered signal. The temporal noise filter 224 performs a temporal noise filtering process upon the video data stored in the memory device 230, and generates a temporal noise filtered signal. The spatial noise filter 226 performs a spatial noise filtering process upon the video data stored in the memory device 230, and generates a spatial noise filtered signal. The selecting unit 228 receives said impulse noise filtered signal, temporal noise filtered signal, spatial noise filtered signal, and the original, unfiltered video data stored in the memory device 230, and then determines which one of the four inputs is to be output according to the detection results provided by the impulse noise detector 212, motion detector 214, and spatial noise detector 216. In this embodiment, if the detection result provided by the impulse noise detector 212 indicates that the video signal has an impulse noise characteristic, the selecting unit 228 then chooses the impulse noise filtered signal as an output; if the video signal does not has an impulse noise characteristic, and the detection result provided by the motion detector 214 indicates that the video signal has a temporal noise characteristic, the selecting unit 228 then chooses the temporal noise filtered signal as an output; if the video signal has neither an impulse noise characteristic nor a temporal noise characteristic, and the detection result provided by the spatial noise detector 216 indicates that the video signal has a spatial noise characteristic, the selecting unit 228 then chooses the spatial noise filtered signal as an output; if the video signal does not have any of the noise characteristics mentioned above, the selecting unit 228 then chooses the original video data as an output. In other words, in this embodiment, the output signal is determined by the selecting unit 228, following the priority of: impulse noise filtered version, then temporal noise filtered version, and then spatial noise filtered version of the video signal. This exemplary priority, however, should not be taken as a limitation of the present invention, and other priorities can also be adopted depending upon design choice.

Please note that in the above-mentioned embodiment, although the noise reduction apparatus 200 makes use of the selecting unit 228 to choose one of the filtering results from a plurality of noise filters as the output according to the detection results provided by detectors 212, 214, and 216, however, this is not meant to be a limitation of the present invention. In other embodiments of the present invention, the selecting unit 228 can be replaced with a computing unit. Unlike the selecting unit 228 choosing one input signal as an output, the computing unit can perform specific computing processes upon a plurality of input video signals (for example, impulse noise filtered signal, temporal noise filtered signal, spatial noise filtered signal, and the original video data stored in the memory device 230) according to the actual requirement for noise reduction. For example, a weighted average operation can be performed upon a portion or all of the above-mentioned video signals, to render an output, wherein the weighting factors of the weighted average operation can be determined according to the above-mentioned detection results or other parameters.

Figure 4:
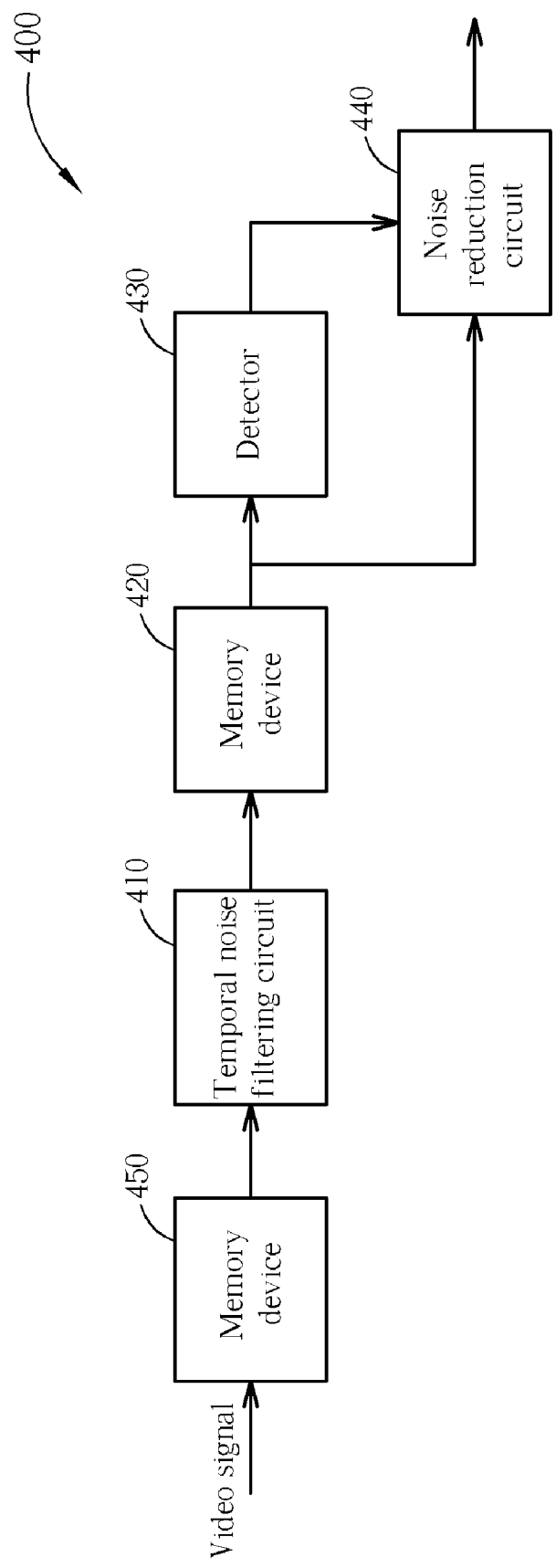
FIG. 4 is a diagram illustrating a noise reduction apparatus for video signals according to a second embodiment of the present invention.

Please refer to FIG. 4. FIG. 4 is a diagram illustrating a noise reduction apparatus 400 for video signals according to a second embodiment of the present invention. The noise reduction apparatus 400 comprises a temporal noise filtering circuit 410, a plurality of memory devices 420, 450, a detector 430, and a noise reduction circuit 440, and is for performing noise detection and reduction processes upon a received video signal on a pixel-by-pixel basis. The temporal noise filtering circuit 410 determines whether to perform temporal noise filtering process upon the video data stored in the memory device 450, in order to reduce the temporal noise of the video signal, and then stores its output to the memory device 420. The detector 430 detects a plurality of noise characteristics of the video data stored in the memory device 420 and generates respective corresponding detection results. The noise reduction circuit 440 determines whether to perform a filtering process upon the video data in response to at least one of the noise characteristics according to the detection results, in order to reduce the noise effect of said noise characteristic.

Figure 5:
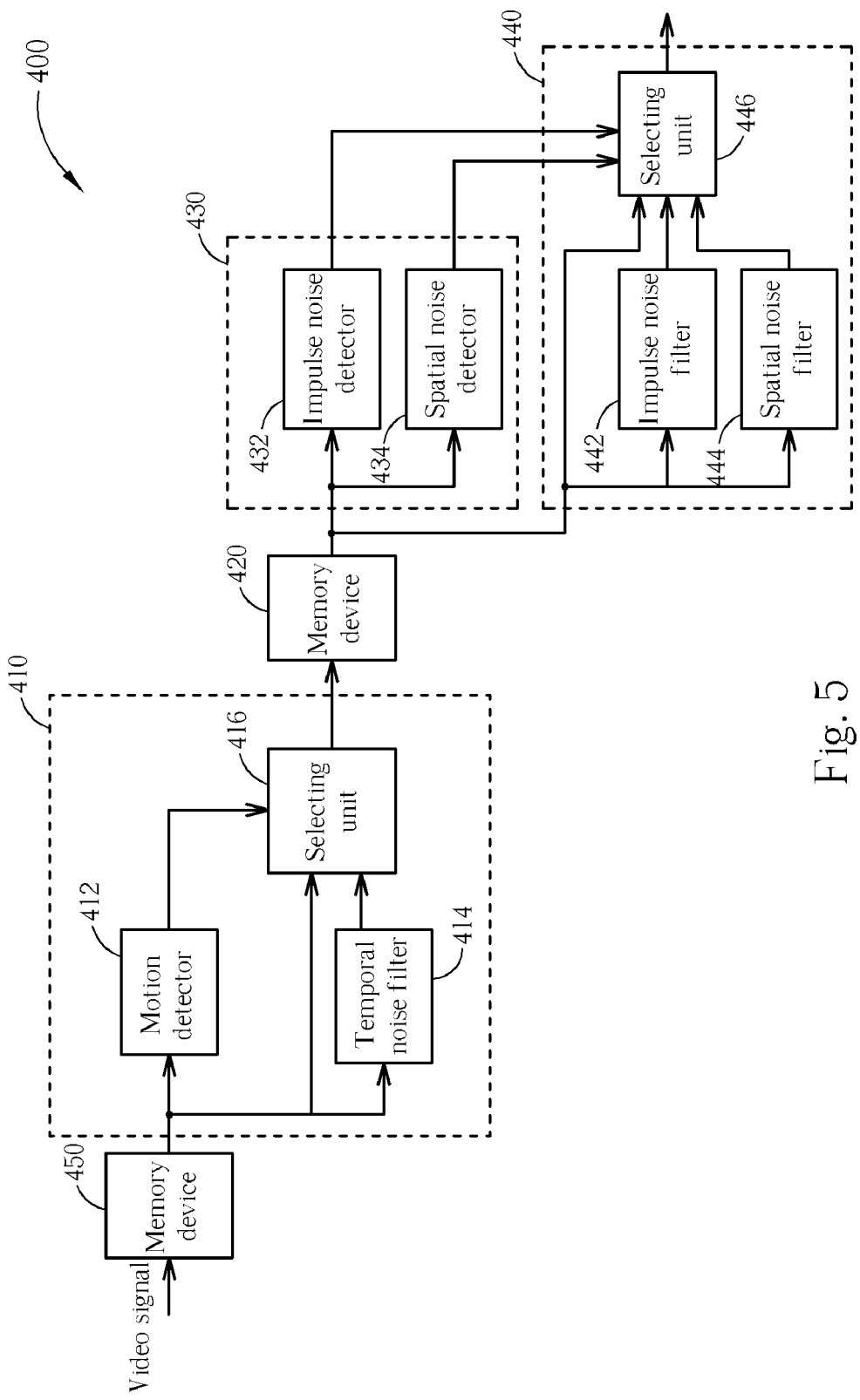
FIG. 5 is a detailed circuit diagram of the noise reduction apparatus shown in FIG. 4.

Please refer to FIG. 5. FIG. 5 is a detailed circuit diagram of the noise reduction apparatus 400 shown in FIG. 4. The temporal noise filtering circuit 410 comprises a motion detector 412, a temporal noise filter 414, and a selecting unit 416. The motion detector 412 is for detecting the degree of motion of the video signal, and determining the temporal noise characteristic of the video signal according to the detected degree of motion. The motion detector 412 performs detection upon the video data stored in the memory device 450, and generates a detection result. In this embodiment, the above-mentioned detection result is a one-bit value for representing whether the video signal has a temporal noise characteristic. The temporal noise filter 414 performs a temporal noise filtering process upon the video data stored in the memory device 450 and generates a temporal noise filtered signal. The selecting unit 416 receives the temporal noise-filtering signal and the original video data stored in the memory device 450, and then determines which of the two inputs is to be outputted according to the detection result provided by the motion detector 412. In this embodiment, if the detection result provided by the motion detector 412 indicates that the video signal has a temporal noise characteristic, the selecting unit 416 then chooses the temporal noise filtered signal as an output; otherwise, the selecting unit 416 chooses the original video data as an output. Lastly, the output signal chosen by the selecting unit 416 is stored in the memory device 420.

The detector 430 further comprises an impulse noise detector 432 and a spatial noise detector 434. Both the above-mentioned detectors receive and detect the video data stored in the memory device 420, wherein the impulse noise detector 432 is aimed at detecting an impulse noise characteristic of the video signal and the spatial noise detector 434 is aimed at detecting a spatial noise characteristic of the video signal. Please note that the impulse noise detector 432 and the spatial noise detector 434 detect the video data stored in the memory device 420 and generate respective detection results. In this embodiment, the above-mentioned detection results are one-bit values for respectively representing whether the video signal has impulse noise and spatial noise characteristics.

The noise reduction circuit 440 comprises an impulse noise filter 442, a spatial noise filter 444, and a selecting unit 446. The impulse noise filter 442 performs an impulse noise filtering process upon the video data stored in the memory device 420 and generates an impulse noise filtered signal. The spatial noise filter 444 performs a spatial noise filtering process upon the video data stored in the memory device 420 and generates a spatial noise filtered signal. The selecting unit 446 receives the impulse noise-filtering signal, the spatial noise-filtering signal, and the video data stored in the memory device 420, and then determines which one of the three inputs is to be outputted according to the detection results provided by the impulse noise detector 432 and the spatial noise detector 434. In this embodiment, if the detection result provided by the impulse noise detector 432 indicates that the video signal has an impulse noise characteristic, the selecting unit 446 then chooses the impulse noise filtered signal as an output; if the video signal does not have an impulse noise characteristic and the detection result provided by the spatial noise detector 434 indicates that the video signal has a spatial noise characteristic, the selecting unit 446 then chooses the spatial noise filtered signal as an output; if the video signal does not have any of the noise characteristics mentioned above, the selecting unit 446 then chooses the video data stored in the memory device 420 as an output.

Please note that in the above-mentioned embodiment, although the noise reduction apparatus 400 makes use of the selecting unit 446 to choose one of the filtering results from a plurality of noise filters as the output according to the detection results provided by detectors 432 and 434, however, this is not meant to be a limitation of the present invention. In other embodiments of the present invention, the selecting unit 446 can be replaced with a computing unit, which can perform specific computing processes upon a plurality of input video signals (for example, an impulse noise filtered signal, a spatial noise filtered signal, and the video data stored in the memory device 420) according to the actual requirements for noise reduction. For example, a weighted average operation can be performed upon a portion or all of the above-mentioned video signals to render an output, wherein the weighting factors of the weighted average operation can be determined according to the above-mentioned detection results or other parameters.

In this embodiment, the process performed by the noise reduction apparatus 400 is divided into two stages, separated by the video data stored in the memory device 450 and the video data stored in the memory device 420. In the first stage, a temporal noise reduction process is performed if it is justified by the noise detection result. After storing the result into the memory device 420, other noise reduction processes, such as an impulse noise reduction process or a spatial noise reduction process, are performed. Under such a system design, as is well understood in the art, the unwanted image artifacts, such as sawtooth or zigzag generated accompanying the temporal noise filtering process, can be smoothed or removed by performing other types of noise filtering processes, thereby improving the image quality.

Please note that, in the above-mentioned embodiments, although individual memory blocks are used for representing storage, such as memory devices 130, 420, and 450, in practice storage can be implemented using line buffers, frame buffers, or other such dedicated memory devices. However, a skilled artisan can readily appreciate that this is not the only embodiment of the present invention. The buffering function can also be implemented by other storage arrangements, such as accessing a shared memory device with a common bus (e.g., a DRAM or FLASH). Further, in the above-mentioned embodiments individual circuit blocks are used for representing the detectors, the filters, and the selecting units. However, a person familiar with circuit design techniques can readily appreciate that these functions can be implemented with dedicated circuits, such as ASICs, or general-purpose circuits, for example, processors with computing capacity for executing suitable instruction sets. Moreover, in the above-mentioned embodiments, only the detections and the filtering processes for impulse noise, temporal noise, and spatial noise are disclosed, but the noise reduction apparatus and method of the present invention are not limited to process these listed noise characteristics. The noise reduction apparatus and method of the present invention can also be used to account for detecting and processing other conventional or new noise types.

Figure 1:
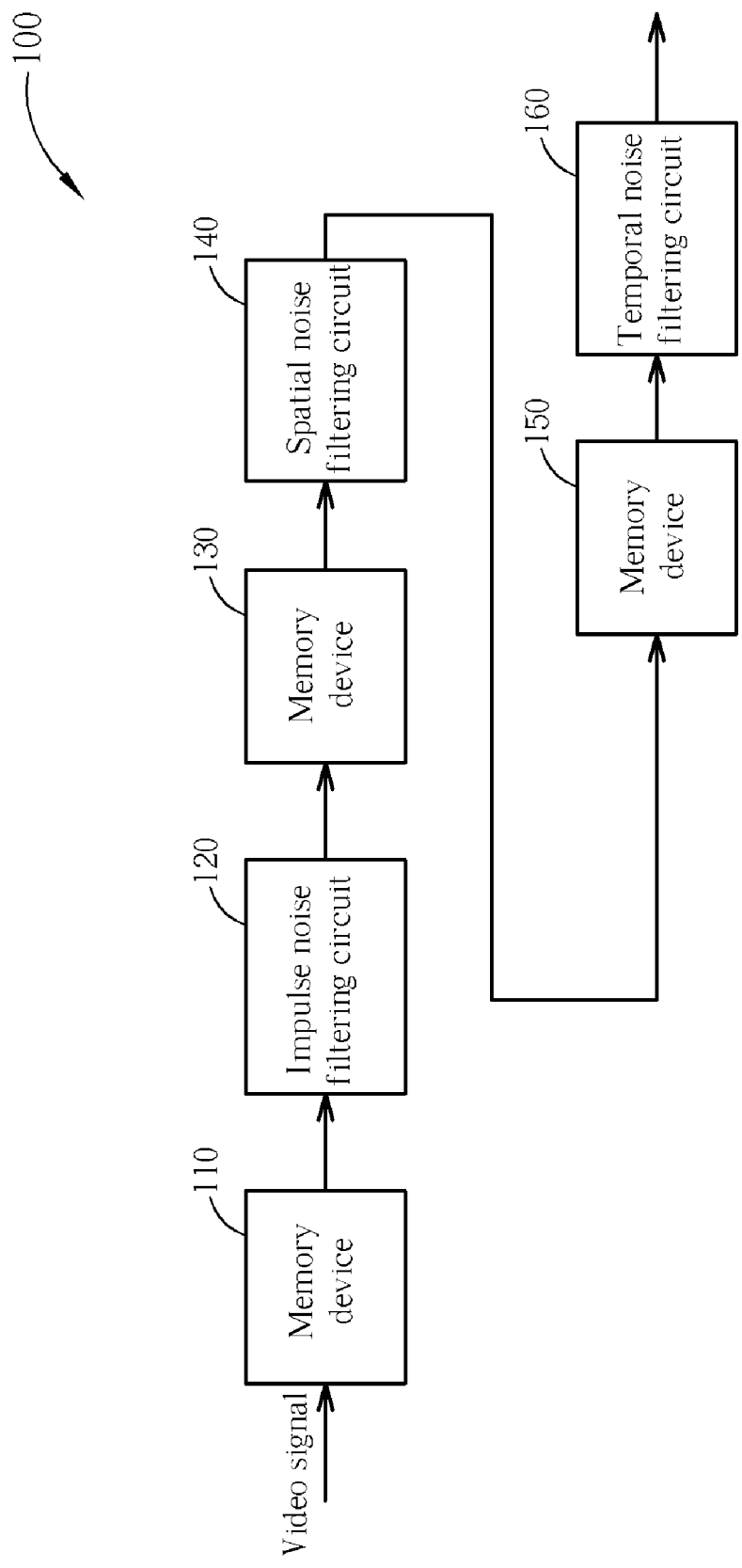
FIG. 1 is a diagram illustrating a typical noise reduction apparatus for processing impulse noise, spatial noise and temporal noise.

According to the foregoing illustration, the noise reduction apparatus 200, 400 in the embodiments of the present invention require less memory devices or less bandwidth for bus when accessing the shared memory device than the conventional apparatus shown in FIG. 1. Therefore, manufacturing costs are reduced, and design flexibility is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A noise reduction apparatus, comprising:
   a first detecting logic, for detecting if a video signal has a first noise characteristic;
   a second detecting logic, for detecting if the video signal has a second noise characteristic;
   a first noise filtering logic, for performing a first noise filtering process upon the video signal to generate a first filtered signal;
   a second noise filtering logic, for performing a second noise filtering process upon the video signal to generate a second filtered signal; and
   an output logic, coupled to the first detecting logic, the second detecting logic, the first noise filtering logic and the second noise filtering logic, for receiving the first filtered signal, the second filtered signal, and the video signal unfiltered, and referencing detection results provided by the first detecting logic and the second detecting logic when generating an output signal.

2. The noise reduction apparatus of claim 1, further comprising:
   a memory device, coupled to the first detecting logic, the second detecting logic, the first noise filtering logic and the second noise filtering logic, for storing the video signal;
   wherein the first detecting logic, the second detecting logic, the first noise filtering logic and the second noise filtering logic read the video signal from the memory device.

3. The noise reduction apparatus of claim 1, wherein the output logic also receives the video signal.

4. The noise reduction apparatus of claim 1, wherein the output logic selects one of a plurality of received signals as the output signal.

5. The noise reduction apparatus of claim 1, wherein the output logic performs a weighted average operation on at least a portion of a plurality of received signals to generate the output signal.

6. The noise reduction apparatus of claim 1, further comprising:
   a third detecting logic, for detecting if the video signal has a third noise characteristic; and
   a third noise filtering logic, for performing a third noise filtering process upon the video signal to generate a third filtered signal;
   wherein the output logic is further coupled to the third detecting logic and the third noise filtering logic, and also receives the third filtered signal.

7. The noise reduction apparatus of claim 1, wherein the first noise filtering process performed by the first noise filtering logic is an impulse noise filtering process, a temporal noise filtering process or a spatial noise filtering process.

8. The noise reduction apparatus of claim 7, wherein the second noise filtering process performed by the second noise filtering logic is an impulse noise filtering process, a temporal noise filtering process or a spatial noise filtering process.

9. A noise reduction method, comprising:
   detecting a video signal to determine if the video signal has a first noise characteristic;
   detecting the video signal to determine if the video signal has a second noise characteristic;
   performing a first noise filtering process upon the video signal to generate a first filtered signal;
   performing a second noise filtering process upon the video signal to generate a second filtered signal; and
   according to detection results of the first noise characteristic and the second noise characteristic, generating and outputting an output signal, wherein a value of the output signal is associated with at least one of the first filtered signal and the second filtered signal, wherein a value of the output is associated with the video signal unfiltered if the video signal does not have at least one of the first and second noise characteristics.

10. The noise reduction method of claim 9, wherein the step of generating and outputting the output signal further comprises:
    selecting one of a plurality of received signals as the output signal, wherein the plurality of received signals comprises the first filtered signal and the second filtered signal.

11. The noise reduction method of claim 9, wherein the step of generating and outputting the output signal further comprises:
    performing a weighted average operation on at least a portion of a plurality of received signals to generate the output signal, wherein the plurality of received signals comprises the first filtered signal and the second filtered signal.

12. The noise reduction method of claim 9, wherein the first noise filtering process is an impulse noise filtering process, a temporal noise filtering process or a spatial noise filtering process.

13. The noise reduction method of claim 12, wherein the second noise filtering process is an impulse noise filtering process, a temporal noise filtering process or a spatial noise filtering process.

14. The noise reduction method of claim 9, further comprising:
    storing the video signal in a memory device;
    in the step of determining if the video signal has the first noise characteristic, reading the video signal from the memory device; and
    in the step of determining if the video signal has the second noise characteristic, reading the video signal from the memory device.

* * * * *